United States Patent
Trifonov et al.

(10) Patent No.: US 7,570,365 B2
(45) Date of Patent: Aug. 4, 2009

(54) COMPACT TUNABLE HIGH-EFFICIENCY ENTANGLED PHOTON SOURCE

(75) Inventors: Alexei Trifonov, Boston, MA (US); Anton Zavriyev, Swampscott, MA (US)

(73) Assignee: MagiQ Technologies, Inc., New York, NY (US)

( * ) Notice: Subject to any disclaimer, the term of this patent is extended or adjusted under 35 U.S.C. 154(b) by 198 days.

(21) Appl. No.: 11/899,359

(22) Filed: Sep. 5, 2007

(65) Prior Publication Data

US 2008/0063015 A1    Mar. 13, 2008

Related U.S. Application Data

(60) Provisional application No. 60/842,785, filed on Sep. 7, 2006.

(51) Int. Cl.
*G01B 9/02* (2006.01)
(52) U.S. Cl. ...................................... 356/480
(58) Field of Classification Search ................ 356/450, 356/480; 372/34, 69, 70; 380/256
See application file for complete search history.

(56) References Cited

U.S. PATENT DOCUMENTS

| | | | | |
|---|---|---|---|---|
| 5,519,526 A | * | 5/1996 | Chua et al. ................ | 398/139 |
| 7,359,514 B2 | * | 4/2008 | Trifonov et al. ............. | 380/256 |
| 2005/0238070 A1 | * | 10/2005 | Imeshev et al. ............. | 372/21 |

OTHER PUBLICATIONS

Ravaro, M. et al. "Nonlinear AlGaAs waveguide for the generation of counterpropagating twin photons in the telecom range". Journal of Applied Physics 98, 063103 (Sep. 27, 2005).*

* cited by examiner

*Primary Examiner*—Michael A Lyons
(74) *Attorney, Agent, or Firm*—Opticus IP Law PLLC

(57) ABSTRACT

A compact, tunable, high-efficiency entangled photon source system that utilizes first and second periodically poled waveguides rather than bulk media in order to decrease the required pump power by up to several orders of magnitude. The first and second waveguides are arranged in respective arms of an interferometer. Each waveguide has partially reflecting ends, and are each placed on the Z-face of respective periodically poled KTP or LiNBO3 crystals to form respective first and second Fabry-Perot cavities. All waves (pump, idler, and signal) are co-polarized along the z-axis of the crystals. One of the waveguides is followed by a polarization rotator (shown as a half-wave-plate in the Figures) rotating the idler and signal wave polarization by 90 degrees. The outputs from two interferometer arms are combined by a polarization beam combiner and then split by a wavelength multiplexer into two spatially separated time-bin and polarization entangled beams. Another light source, a single frequency stabilized C-band laser (stabilization laser) is used to synchronize cavities spectral modes and phase-lock their outputs.

4 Claims, 2 Drawing Sheets

## COMPACT TUNABLE HIGH-EFFICIENCY ENTANGLED PHOTON SOURCE

CLAIM OF PRIORITY

The present invention claims priority under 35 USC § 119(e) from U.S. Provisional Patent Application Ser. No. 60/842,785, filed on Sep. 7, 2006, which patent application is incorporated by reference herein.

FIELD OF THE INVENTION

The present invention relates generally single-photon sources, and in particular single-photon sources based on entangled photons.

BACKGROUND ART

Single-photon light sources are finding increasing use for a variety of applications, including quantum computing and quantum communications. One type of single-photon source utilizes entangled photons, wherein the photons are generated in a manner that results in their "correlation" so that measurements performed on one entangled photon have an effect on the other entangled photon.

One way of generating entangled photons is through spontaneous parametric down conversion (SPDC), whereby an incident photon of a given frequency interacts with a non-linear optical medium to generate two entangled photons whose combined energy and momentum is equal to that of the incident photon. By detecting one of the entangled photons (the "signal" photon), then one is assured that its partner (the "idler" photon) is present.

Polarization entanglement between 702-nm photons produced via SPDC of 351-nm pump light in a pair of bulk BBO crystals has been recently demonstrated. While this approach works well for proof of principle experiments, beam walk off and a short interaction length tend to limit the conversion efficiency, making bulk crystals unsuitable for building a compact low-power-consumption photon source.

As has also recently been shown, surface waveguides embedded in periodically poled bulk substrates can exhibit a much higher conversion efficiency and require lower pump power in order to achieve the same output photon flux. The high efficiency and low power consumption of the waveguides makes them a superior choice when weight carrying and power production capabilities are restricted, such as for example, space exploration spacecraft or most commercial applications that might use a single-photon light source, such a quantum key distribution systems.

While parametric downconversion has been investigated in great detail in many different bulk crystals, there appear to be only two suitable waveguide candidates: periodically poled LiNbO3 (PPLN) and periodically poled KTP (PPKTP). While PPLN might have stronger non-linearity and, consequently, higher conversion efficiency, it is susceptible to producing a higher proportion of non-correlated photons that can pollute the communication channel of a quantum communication system.

SUMMARY OF THE INVENTION

The present invention is directed to a compact, tunable, high-efficiency entangled photon source system that utilizes first and second periodically poled waveguides rather than bulk media in order to decrease the required pump power by up to several orders of magnitude. The first and second waveguides are arranged in respective arms of an interferometer. Each waveguide has partially reflecting ends, and are each placed on the Z-face of respective periodically poled KTP, LiNBO3 or other non-linear crystals to form respective first and second Fabry-Perot cavities. All waves (pump, idler, and signal) are co-polarized. One of the waveguides is followed by a polarization rotator (shown as a half-wave-plate in the Figures) rotating the idler and signal wave polarization by 90 degrees. The outputs from two interferometer arms are combined by a polarization beam combiner and then split by a wavelength multiplexer into two spatially separated polarization entangled beams. Another light source, a single frequency stabilized C-band laser (stabilization laser) is used to synchronize cavities spectral modes and phase-lock their outputs. Without stabilization, each cavity chooses its own modes and, consequently, its own signal and idler wavelengths. The present invention includes controlling the cavities lengths by adjusting the temperature of the waveguides via thermo-electric coolers (TEC) controlled by a controller. Each TEC current is adjusted by the controller to optimize the stabilization laser transmission through the cavities. This insures that both cavities can support transmission of the stabilization laser and, therefore share the modal profile.

One aspect of the invention is a compact, tunable, high-efficiency entangled photon source system that utilizes first and second periodically poled waveguides rather than bulk media in order to decrease the required pump power by up to several orders of magnitude. The first and second waveguides are arranged in respective arms of an interferometer. Each waveguide has partially reflecting ends, and are each placed on the Z-face of respective periodically poled KTP or LiNBO3 crystals to form respective first and second Fabry-Perot cavities. All waves (pump, idler, and signal) are co-polarized along the z-axis of the crystals. One of the waveguides is followed by a polarization rotator (shown as a half-wave plate in the Figures) that rotates the idler and signal wave polarization by 90 degrees.

The outputs from two interferometer arms are combined by a polarization beam combiner and then split by a wavelength multiplexer into two spatially separated time-bin and polarization entangled beams. Another light source, a single frequency stabilized C-band laser (stabilization laser) is used to synchronize cavities spectral modes and phase-lock their outputs. Without stabilization, each cavity chooses its own modes and, consequently, its own signal and idler wavelengths. The present invention includes controlling the cavities lengths by adjusting the temperature of the waveguides via thermo-electric coolers (TEC) controlled by a controller. Each TEC current is adjusted by the controller to optimize the stabilization laser transmission through the cavities. This insures that both cavities can support transmission of the stabilization laser and, therefore share the modal profile.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

Whenever possible, the same reference numbers or letters are used throughout the drawings to refer to the same or like parts.

DETAILED DESCRIPTION OF THE PREFERRED EMBODIMENTS

An entangled photon source based on the parametric down conversion of the pump light has many potential applications. It had been shown that using a waveguide as underlying media results in the increased conversion efficiency and simplifies setup. A narrow linewidth output favored by many applications (spectroscopy, communications in the presence of ambient light, etc.) often requires that a Fabry-Perrot cavity is placed around the non-linear media used for the frequency conversion (i.e.—the waveguide). Because of the spatial mode mismatch between the cavity and the waveguide, the round trip loss can be relatively high. In this case, the cavity-enhanced photon lifetime can lead to the increased loss and decreased source efficiency.

One way to alleviate this problem is to limit the cavity length to the crystal length (i.e.—put the reflective coating directly onto the crystal faces). While this approach minimizes the intra-cavity loss, it introduces problems of its own.

Because of the crystal asymmetry, waveguides are best suited for Type I processes (when both resulting waves are polarized in the same plane). Since in this case both photons of the resulting entangled pair share both, spatial and polarization mode, it is very hard to separate them.

By substituting bulk media with periodically poled waveguides, the required pump power is decreased by up to several orders of magnitude.

Figure 1:
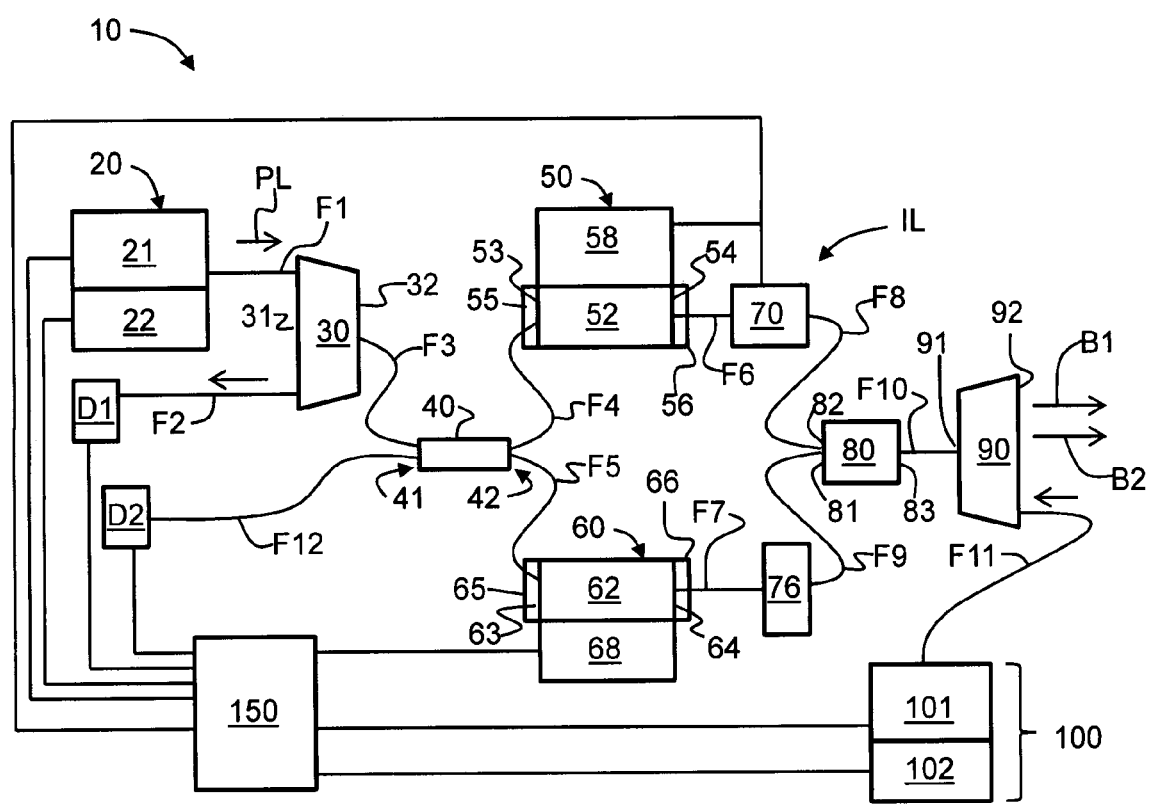
FIGS. 1 and 2 are schematic diagrams of the photon source system according to the present invention.
Figure 2:
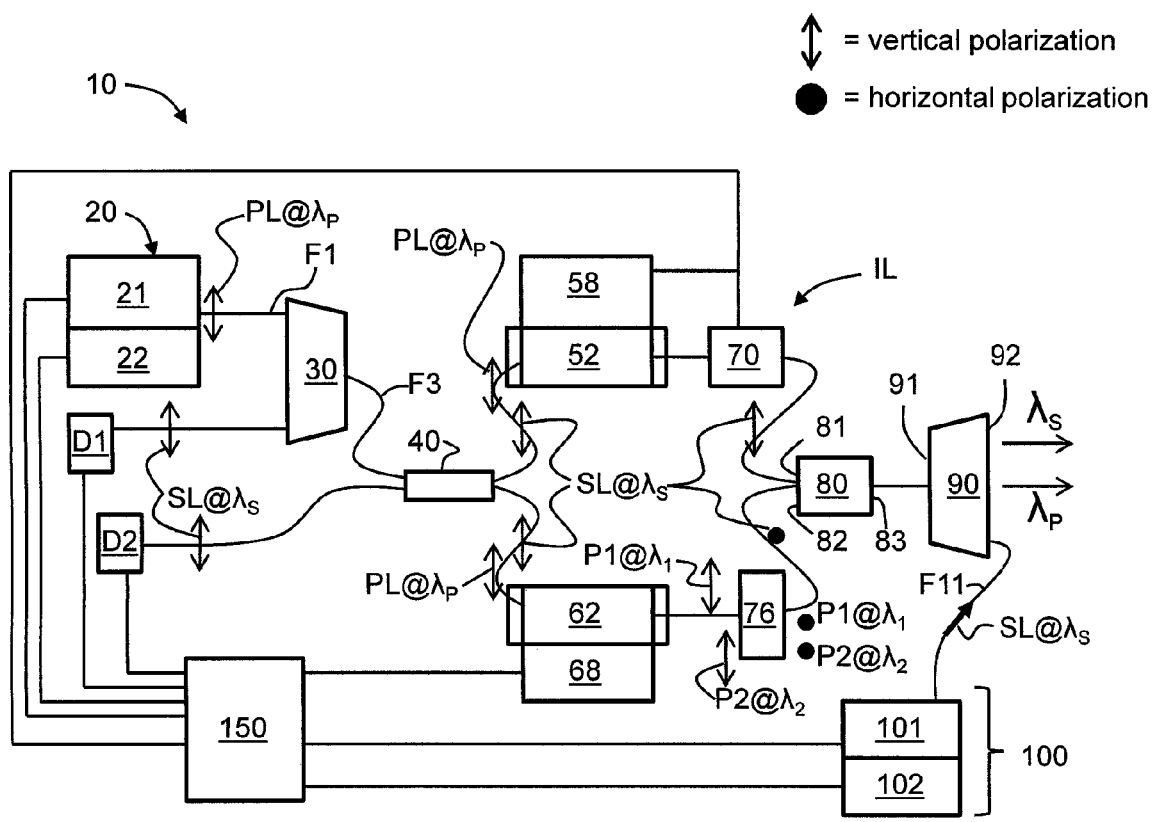

FIG. 1 is a schematic diagrams of example embodiment of the compact, tunable, high-efficiency entangled photon source system according to the present invention. FIG. 2 is similar to FIG. 1 and illustrates the various polarization states of the various light beams present in photon source 10.

With reference to FIGS. 1 and 2, there is shown an example embodiment of a compact, tunable, high-efficiency entangled photon source system ("photon source") 10. Photon source 10 includes a pump light source unit 20 that includes a pump light source 21 (e.g., a 775 nm laser) that emits polarized (e.g., vertically polarized) pump light PL. Pump light source 20 includes a temperature control unit 22 adapted to control the temperature of pump light source 21.

Pump light source 20 is optically coupled via an optical fiber section F1 to an optical multiplexer 30 that has an input side 31 and an output side 32. A first detector D1 is optically coupled to multiplexer input side 31 via an optical fiber section F2. Multiplexer 30 is optically coupled at its output side 32 to an optical coupler 40 (e.g., a 3 dB coupler) via an optical fiber section F3. Optical coupler 40 has an input end 41 and an output end 42, and multiplexer 30 output end is optically coupled to coupler input end 41 via optical fiber section F3.

Coupler 40 is optically coupled at output end 42 via an optical fiber section F4 to a first waveguide unit 50 that includes a first waveguide 52 having an input side 53 and an output side 54, and a thermoelectric cooling unit 58 in thermal communication with the first waveguide. Reflective coatings 55 and 56 are provided at input and output ends 53 and 54, respectively, to create a Fabry-Perot cavity. Likewise, coupler 40 is also optically coupled at output end 42 via an optical fiber section F5 to a second waveguide unit 60 that includes a second waveguide 62 that includes an input side 63 and an output side 64, and a thermoelectric cooling unit 68 in thermal communication with the second waveguide. Reflective coatings 65 and 66 are provided at input and output ends 63 and 64, respectively, to create a Fabry-Perot cavity. In an example embodiment, first and second waveguides 52 and 62 are formed from the same type of non-linear optical material.

A phase shifter 70 is optically coupled to first waveguide output end 54 via an optical fiber section F6, and a half-wave plate 76 is optically coupled to second waveguide output end 64 via an optical fiber section F7. Phase shifter 70 and half-wave plate 76 are optically coupled to a beamsplitter 80 via respective optical fiber sections F8 and F9 at respective beamsplitter input ports 81 and 82. Beamsplitter 80 is in turn optically coupled at a beamsplitter output port 83 to a multiplexer 90 at a multiplexer input side 91 via an optical fiber section F10. A stabilization laser system 100 that includes a stabilization laser 101 and a temperature control unit 102 in thermal communication with the stabilization laser is optically coupled to a multiplexer output side 92 via an optical fiber section F11. Stabilization laser emits stabilization light SL at a stabilization wavelength $\lambda_S$.

Photon source 10 also includes a second detector D2 optically coupled to coupler input end 41 via an optical fiber section F12. A controller 150 is operably coupled to detectors D1 and D2, to pump laser system 20, to first waveguide unit 50, to second waveguide unit 60, and to stabilization laser unit 100. In an example embodiment, controller 150 is or includes a computer or microprocessor having instructions for operating the photon source. The instructions can, for example, be embodied or otherwise implemented in hardware or software, such as in one or more software programs comprised of program instructions in source code, object code, executable code or other formats. Any of the above formats can be embodied on a computer-readable medium, which include storage devices and signals, in compressed or uncompressed form. Exemplary computer-readable storage devices include conventional computer system RAM (random access memory), ROM (read only memory), EPROM (erasable, programmable ROM), EEPROM (electrically erasable, programmable ROM), flash memory and magnetic or optical disks or tapes.

In the operation of photon source 10, controller 150 directs pump light source 21 to emit pump light PL. Pump light PL is split into two equal beams at coupler 40. These two pump beams pump waveguides 52 and 62, which in an example embodiment are configured for similar conditions (i.e., a non-degenerate Type I process). The polarization of the waveguide 62 output is flipped by a half-wave plate arranged at the output end of this waveguide by half-Wave plate 76. Idler and signal photons P1 and P2 with respective wavelengths $\lambda_1$ and $\lambda_2$ correspond to the two frequency modes of the Fabry-Perot cavity defined by waveguides 52 and 62, respectively. Waveguides 52 and 62 thus generate idler and signal photons that travel to beamsplitter 80 and are then sent to multiplexer 90, which wavelength-separates these photons.

If the pump power of pump light PL is kept low enough to limit the photon pair production rate to no more than one event per pump cycle in the bandwidth of interest, one obtains a source of spatially distinguishable entangled photon pairs whose polarization randomly switches between two states (vertical and horizontal).

In an example embodiment, both waveguides 52 and 62 are pumped by a narrow band pump light source 21 having a wavelength centered at about 775 nm. Continuous-wave (CW) pump output is externally modulated by controller 150 and the pump light PL split into two beams by (3-dB) coupler 40. Each pump light beam is directed to the two identical waveguides 52 and 62 residing in respective arms of the interferometer loop IL formed by optical fiber sections F4-F9, coupler 40 and beamsplitter 80. The intensity modulation provides the timing information for the synchronous outputs.

In an example embodiment, waveguides 52 and 62 are placed on the Z-face of periodically poled KTP or LiNbO3 crystals cut for Type I process. Together with the partially reflective coatings 55 and 56 for waveguide 52 and 65 and 66 for waveguide 62) provided at the respective waveguide input and output ends. Each crystal constitutes its own monolithic Fabry-Perot cavity. All waves (pump, idler, and signal) are co-polarized along the z-axis of the crystals. One of the waveguides is followed by a polarization rotator (shown as a half-wave-plate 76 in FIG. 1), which rotates the idler and signal wave polarizations by 90 degrees. The outputs from the two interferometer arms are combined by a (polarizing) beam splitter 80 (which in the present instance acts as a "beam combiner). The output are then split by wavelength multiplexer 90 into two spatially separated time-bin and polarization entangled beams B1 and B2 constituted by polarization-entangled photon pairs.

Stabilization laser unit 100 is used to synchronize the cavity spectral modes and phase-lock their outputs. Stabilization light source 101 is, for example, a single frequency stabilized C-band laser. Without such stabilization, each cavity chooses its own modes and, consequently, its own signal and idler wavelengths. The cavity lengths are controlled by adjusting the temperature of the waveguides via thermo-electric cooling units 58 and 68. The current to each of these units is adjusted by controller 150 to optimize the stabilization laser transmission through the two waveguide cavities. This insures that both waveguide cavities associated with waveguides 52 and 62 can support transmission of the stabilization laser and, therefore share the same modal profile.

Another purpose of stabilization laser unit 100 is to phase-lock the interferometer arms as required for polarization entanglement. After back-propagating through the system, the light is interfered at coupler 40 and is directed into a pair of detectors D1 and D2. Based on the signal ratio determined at controller 150, the voltage applied to the phase shifter 70 is adjusted to control the phase of one of the beams in order to keep the relative phase shift constant. Note that in an example embodiment, stabilization laser 101 is optically coupled to wavelength multiplexer 90 at the output end of photon source 10 so that the stabilizing light can back-propagate through the system.

In order to facilitate device usage in reconfigurable communication networks, the output wavelength is made tunable by tuning the pump wavelength. The entangled photon wavelength is changed by controller 150 by simply tuning the pump laser temperature and, consequently, its wavelength. This, in turn, changes phase matching in the waveguides, resulting in the output wavelength change. Unlike tunable switches that contain moving parts, this method of spectral tuning does not affect the output pointing stability—a feature important for long distance free space communications. In an example embodiment, controller 150 is adapted to control the temperature control units as well as the other active elements via corresponding control signals (not shown).

The Fabry-Perot cavities formed using waveguides 52 and 62 with reflective input and output ends results in a narrow output linewidth, a feature important for daylight communication when ambient light needs to be filtered out. In order to make the photon source rugged and minimize its size, in an example embodiment monolithic waveguide-based mirrorless Fabry-Perot cavities with reflective coatings attached directly to the waveguide end-faces are employed.

Output frequency tuning is accomplished by adjusting the pump light source temperature via controller 150. Lack of moving parts makes the system fast and reliable. The outputs of the two waveguides 52 and 62 are phase locked via the stabilization laser unit, and combined to create entanglement in the polarization domain. The output multiplexer 90 is used as a demultiplexer to spatially separate the entangled idler and signal photons.

While the present invention is described above in connection with preferred embodiments, it will be understood that it is not so limited. On the contrary, it is intended to cover all alternatives, modifications and equivalents as may be included within the spirit and scope of the invention as defined in the appended claims.

What is claimed is:

1. A single-photon source system, comprising:
an interferometer loop that includes first and second arms and that has an input end and an output end;
first and second temperature-controlled periodically poled non-linear waveguides each having opposite input and output ends and respectively arranged in the first and second arms, wherein the input and output ends of each waveguide are adapted to create a Fabry-Perot cavity surrounding each waveguide;
a temperature-controlled pump light source optically coupled to the input end of the interferometer loop so as to provide pump light to each waveguide;
a phase-shifter arranged adjacent the output end of the first waveguide and optically coupled thereto;
a polarization rotator arranged adjacent the output end of the second waveguide and optically coupled thereto;
a polarizing beam splitter arranged at the output end of the interferometer loop so as to combine outputs from the first and second interferometer arms; and
a wavelength multiplexer arranged downstream of the polarizing beam splitter so as to spatially separate entangled photons; and
wherein a narrow band stabilized laser is operably coupled to the wavelength multiplexer so as to synchronize cavity spectral modes of the waveguide Fabry-Perot cavities and phase lock respective outputs of the Fabry-Perot cavities associated with the first and second waveguides.

2. The system of claim 1, including controlling the Fabry-Perot cavity lengths by adjusting respective temperatures of the temperature-controlled waveguides.

3. The system of claim 1, wherein the first and second non-linear waveguides are formed from PPLN.

4. The system of claim 1, wherein the first and second non-linear waveguides are formed from PPKTP.

* * * * *